A. ELTEN, Jr.
VEHICLE WHEEL.
APPLICATION FILED MAY 1, 1915. RENEWED JULY 30, 1920.

1,371,552.

Patented Mar. 15, 1921.

UNITED STATES PATENT OFFICE.

ALFRED ELTEN, JR., OF BREMEN, GERMANY.

VEHICLE-WHEEL.

1,371,552.  Specification of Letters Patent.  Patented Mar. 15, 1921.

Application filed May 1, 1915, Serial No. 25,243. Renewed July 30, 1920. Serial No. 400,214.

*To all whom it may concern:*

Be it known that I, ALFRED ELTEN, Jr., a citizen of the United States, at present residing at Bremen, Germany, have invented certain new and useful Improvements in Vehicle-Wheels; and I do hereby declare that the following is a full, clear, and exact description of the invention, such as will enable others skilled in the art to which it appertains to make and use the same, reference being had to the accompanying drawings, forming part of this specification.

This invention relates to resilient wheels of the class in which the stresses on the hub are yieldingly transmitted to the tire-rim, or vice versa, through carrying members and intermediate, revoluble spacing members, that translate any motion of the tire-rim in relation to the hub in the plane of the wheel, caused by such stresses, into a corresponding motion, at right angles to the plane of the wheel, of part of the carrying members, thereby varying the distance between the carrying members, against the resistance of resilient means.

The present invention consists in arranging the supporting abutments that are on one side of the spacing members, on a carrying member of the wheel that is capable of a sliding motion on its support, substantially at right angles to the plane of the wheel and against the resistance of resilient means.

The object of the invention is to provide a thoroughly practical wheel of this nature, in which any and all of the shocks or vibrations experienced by the tire-rim when passing over ordinary obstacles on the road, are prevented from reaching the hub.

One embodiment of the present invention is disclosed in the structure illustrated in the accompanying drawings, in which:—

Figure 1:
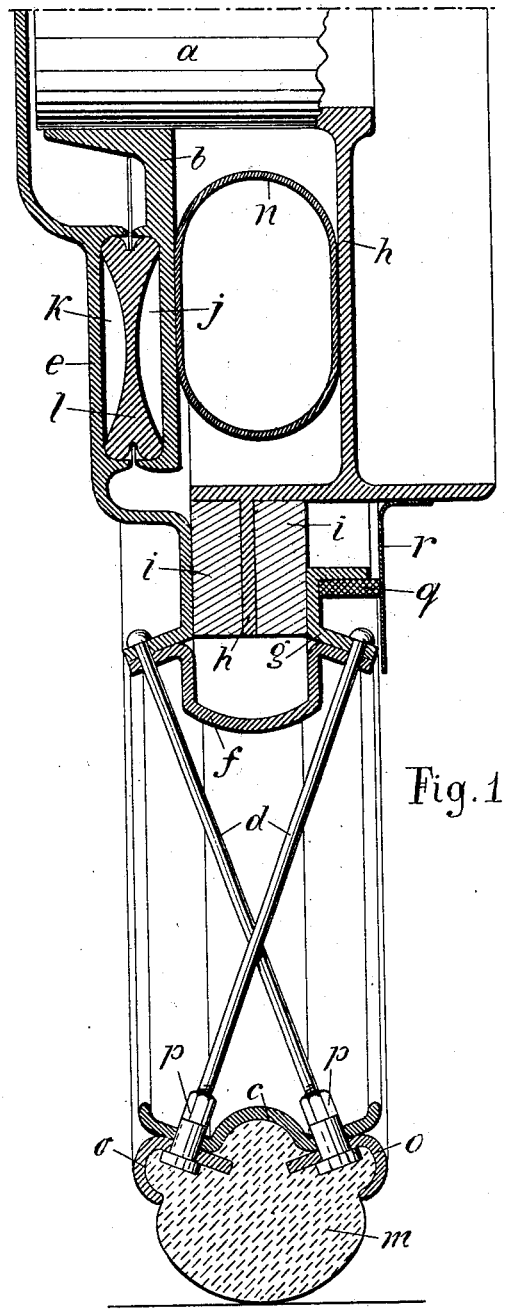
Figure 2:
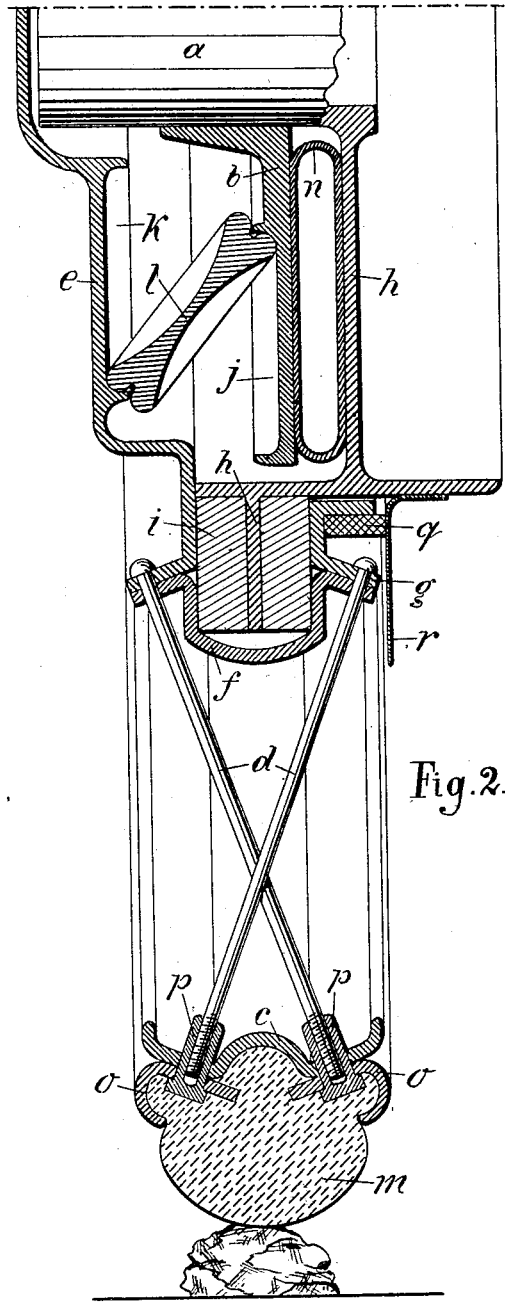
Figure 3:
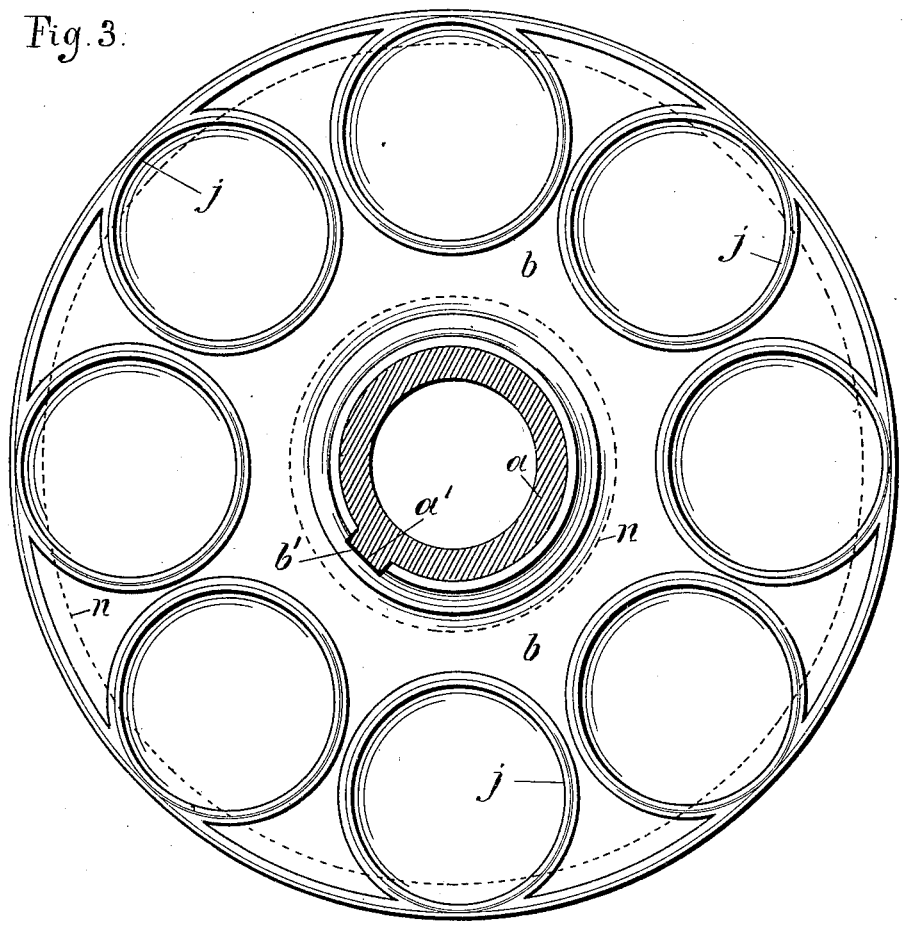
Figure 4:
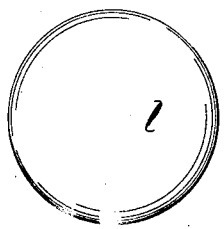

Figure 1 is a vertical, central cross-section of the lower half of an unweighted wheel, Fig. 2 is a similar view of the wheel when passing over an obstacle, Fig. 3 is a side view of the laterally movable carrying member with the supporting abutments for the spacing members, and Fig. 4 is a side view of a spacing member.

On the hub $a$ is mounted the disk or carrying member $b$ having a slot $b'$ that engages the feather $a'$ on the hub $a$ and therethrough permits of a motion of the carrying member $b$ at right angles to the plane of the wheel, that is to say the disk may slide upon the hub.

The tire-rim $c$ holds, through the medium of the wire spokes $d$, the carrying member $e$ that forms, with the annular parts $f$ and $g$ a U-shaped channel for the reception of the outer rim of the disk $h$ to which are secured the side-bearing rings $i$. Thus, disk $h$, that forms part of the hub $a$, may have a limited motion in every direction in the plane of the wheel, relative to the tire-rim, or vice versa.

The carrying members $b$ and $e$ are, each provided with a number of circular recesses $j$ and $k$, respectively, that form the supporting abutments for the lens-shaped spacing members $l$. In the concentric condition of the unweighted wheel, Fig 1, the spacing members $l$ are completely embedded in their recesses and held in their positions parallel to the carrying members $b$ and $e$ as long as the counterpressure exerted by the air confined in the annular cushion $n$ is in excess of the pressure of the load on the hub, that is transmitted through the medium of the spacing members $l$, diagonally, from the carrying member $b$ to the carrying member $e$ and the tire-rim $c$.

I prefer to use, in conjunction with the constructional features herein shown and described spacing members of the character shown and described in my application for Letters Patent, Serial No. 25,242, that cause the pressure between the carrying members to increase at an increasing rate.

When the wheel passes over an obstacle, Fig. 2, and the forward motion of the tire-rim is thereby retarded, the effect of the *vis viva* of the load on the hub is, to cause the carrying member $b$ to move at right angles to the plane of the wheel, until the counterpressure of the cushion or resilient means balances the pressure of the stresses.

An endless leather strip $q$, the outer edge of which is adapted to slide across the face of disk $r$, serves to protect the bearing surfaces of the rings $i$ from dust, dirt, etc.

While the inner ends of the wire spokes $d$ securely hold together the parts $e$, $f$ and $g$, the outer ends of the same, with their nuts $p$, securely hold together the tire-rim $c$ and the two side rings $o$ that grip the tire $m$.

In the place of the air cushion $n$ I may employ other resilient means, and I may arrange the carrying members otherwise, as long as the action of the spacing members is, to obliquely further separate the carrying members, in case of shocks.

From the foregoing it will be understood that the wheel comprises inner and outer parts, which are normally concentric but are movable into eccentric relation by forces acting in the plane of the wheel. The inner part includes the hub $a$ with the disk or flange $h$ fixed thereto and carrying the side bearing rings $i$, which slide in the channel of the outer part, and the carrying member $b$ which is mounted slidably upon the hub. The outer part includes the rim elements and the spokes, the carrying member $e$ and the annular pieces $f$ and $g$ which complete the channel just referred to. The lenticular tilting thrust members $l$ interposed between the recesses $j$ and $k$ in the carrying members $b$ and $e$ operate under increasing load or shock, by reason of the eccentric movement between the inner and outer parts of the wheel, to force the carrying member $b$ laterally on the hub against the resistance of the cushioning means $n$. When the disturbing force is removed, the resilient element restores the member $b$ into proximity to the member $e$, and this movement through the action of the tilting thrust members causes the inner and outer parts of the wheel to assume the concentric relation.

What I claim as new is:—

1. A vehicle wheel comprising hub and rim portions normally substantially concentric and capable of relative eccentric movement under varying load and shock, carrying members connected respectively with said hub and rim portions and capable of relative eccentric movement therewith, one of said carrying members being also capable of lateral movement, tilting thrust members interposed between said carrying members to separate the same under increasing load or shock, and resilient cushioning means opposing such separation.

2. A vehicle wheel comprising hub and rim portions normally substantially concentric and capable of relative eccentric movement under varying load and shock, carrying members connected respectively with said hub and rim portions and capable of relative eccentric movement therewith, one of said carrying members having a slidable bearing upon its wheel portion whereby it may move laterally, tilting thrust members interposed between said carrying members to separate the same under increasing load or shock, and resilient cushioning means opposing such separation 3. A vehicle wheel comprising hub and rim portions normally substantially concentric and capable of relative eccentric movement under varying load and shock, a carrying member united with the rim portion and provided adjacent the hub with a series of abutments, another carrying member laterally slidable upon the hub portion while coupled thereto with respect to rotation and having an opposing series of abutments, tilting thrust members interposed between the abutments of said carrying members, and resilient cushioning means opposing lateral movement of the sliding carrying member.

In testimony whereof I have hereunto set my hand in presence of two subscribing witnesses.

ALFRED ELTEN, JUN. [L. S.]

Witnesses:
   HELEN NUFER,
   ALBERT NUFER.